United States Patent
Kim et al.

(10) Patent No.: US 11,545,670 B2
(45) Date of Patent: Jan. 3, 2023

(54) CATHODE ADDITIVE, PREPARATION METHOD THEREOF, AND CATHODE AND LITHIUM SECONDARY BATTERY COMPRISING THE SAME

(71) Applicant: LG Chem, Ltd., Seoul (KR)

(72) Inventors: Ji Hye Kim, Daejeon (KR); Byungchun Park, Daejeon (KR); Jungmin Han, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 280 days.

(21) Appl. No.: 16/757,783

(22) PCT Filed: Nov. 27, 2018

(86) PCT No.: PCT/KR2018/014725
§ 371 (c)(1),
(2) Date: Apr. 21, 2020

(87) PCT Pub. No.: WO2019/103576
PCT Pub. Date: May 31, 2019

(65) Prior Publication Data
US 2020/0266447 A1    Aug. 20, 2020

(30) Foreign Application Priority Data

Nov. 27, 2017  (KR) ................. 10-2017-0159731
Nov. 26, 2018  (KR) ................. 10-2018-0147752

(51) Int. Cl.
*H01M 4/62*       (2006.01)
*C01G 53/00*     (2006.01)
(Continued)

(52) U.S. Cl.
CPC ............ *H01M 4/628* (2013.01); *C01G 53/42* (2013.01); *C01G 53/50* (2013.01); *H01M 4/362* (2013.01);
(Continued)

(58) Field of Classification Search
None
See application file for complete search history.

(56) References Cited

U.S. PATENT DOCUMENTS 5,817,436 A     10/1998   Nishijima et al.
2005/0118496 A1  6/2005   Chang et al.
(Continued)

FOREIGN PATENT DOCUMENTS

JP    H09241027 A    9/1997
JP    2012142156 A   7/2012
(Continued)

OTHER PUBLICATIONS

Bian et al., Improved Electrochemical Performance and Thermal Stability of Li-excess Li1.18Co0.15Ni0.15Mn0.52O2 Cathode Material by Li3PO4 Surface Coating, Jun. 2015, Electrochim Acta, 174, 875-884 (Year: 2015).*

(Continued)

*Primary Examiner* — Daniel S Gatewood (57) ABSTRACT

The present disclosure relates to a cathode additive, a method for preparing the same, and a cathode and a lithium secondary battery including the same. More specifically, one embodiment of the present disclosure provides a cathode additive that can offset an irreversible capacity imbalance, increase the initial charge capacity of a cathode, and simultaneously inhibit the generation of a gas in a battery.

20 Claims, 4 Drawing Sheets

(51) Int. Cl.
*H01M 4/36* (2006.01)
*H01M 4/505* (2010.01)
*H01M 4/525* (2010.01)
*H01M 10/0525* (2010.01)

(52) U.S. Cl.
CPC ........... *H01M 4/505* (2013.01); *H01M 4/525* (2013.01); *H01M 10/0525* (2013.01); *C01P 2002/72* (2013.01); *C01P 2004/80* (2013.01); *C01P 2006/40* (2013.01)

(56) References Cited

U.S. PATENT DOCUMENTS

| | | |
|---|---|---|
| 2010/0203388 A1 | 8/2010 | Kim et al. |
| 2012/0135305 A1 | 5/2012 | Kim et al. |
| 2012/0164533 A1 | 6/2012 | Senoue et al. |
| 2015/0340692 A1 | 11/2015 | Park et al. |
| 2017/0179484 A1 | 6/2017 | Park et al. |
| 2017/0200951 A1 | 7/2017 | Hong et al. |

FOREIGN PATENT DOCUMENTS

| | | |
|---|---|---|
| KR | 20060008568 A | 1/2006 |
| KR | 100889622 B1 | 3/2009 |
| KR | 20120056674 A | 6/2012 |
| KR | 20150028206 A | 3/2015 |
| KR | 20160026402 A | 3/2016 |
| KR | 101614015 B1 | 4/2016 |
| KR | 20160118081 A | 10/2016 |
| KR | 20170071945 A | 6/2017 |
| KR | 20170084995 A | 7/2017 |
| KR | 20170096673 A | 8/2017 |
| WO | 2012176903 A1 | 12/2012 |

OTHER PUBLICATIONS

Bian et al., Improved Electrochemical Performance and Thermal Stability of Li-excess Li1.18Co0.15Ni0.15Mn0.52O2 Cathode Material by Li3P04 Surface Coating, Electrochimica Acta, Jun. 23, 2015, pp. 875-884, vol. 174, Elsevier, XP029251071.
Extended European Search Report including Written Opinion for Application No. EP18881390.1, dated Nov. 12, 2020, pp. 1-5.
Song et al, Enhanced electrochemical properties of Li(NiCoMn)Ocathode by surface modification using LiPO-based materials, Journal of Power Sources, Sep. 22, 2010, pp. 6847-6855, vol. 196, Elsevier, XP028226114.
Wang et al., Enhanced electrochemical performance of Li-rich cathode Li[Li0.2Mn0.54Ni0.13Co0.13]O2 by surface modification with lithium ion conductor Li3PO4, Applied Surface Science, Feb. 16, 2016, pp. 437-444, vol. 370, Elsevier, XP029473913.
International Search Report from Application No. PCT/KR2018/014725 dated Apr. 24, 2019, 2 pages.

* cited by examiner

CATHODE ADDITIVE, PREPARATION METHOD THEREOF, AND CATHODE AND LITHIUM SECONDARY BATTERY COMPRISING THE SAME

CROSS-REFERENCE TO RELATED APPLICATION

The present application is a national phase entry under 35 U.S.C. § 371 of International Application No. PCT/KR2018/014725 filed Nov. 27, 2018, the disclosure of which is incorporated herein in its entirety by reference, which claims priority to and the benefit of Korean Patent Application No. 10-2017-0159731 filed on Nov. 27, 2017 and Korean Patent Application No. 10-2018-0147752 filed on Nov. 26, 2018 with the Korean Intellectual Property Office, the disclosures of which are hereby incorporated by reference herein in their entirety.

TECHNICAL FIELD

The present disclosure relates to a cathode additive, a method for preparing the same, and a cathode and a lithium secondary battery including the same.

BACKGROUND ART

A lithium secondary battery uses electrode active materials capable of reversible intercalation and deintercalation of lithium ions, in an anode and a cathode, realizes the transfer of lithium ions by an electrolyte, and produces electrical energy by the oxidation and reduction reactions in each electrode.

However, during the $1^{st}$ cycle charge-discharge of a lithium secondary battery, lithium ions that are intercalated in an anode (battery charge) and then deintercalated (battery discharge), and lithium ions that are deintercalated from a cathode (battery charge) and then cannot be recovered again (battery discharge) are necessarily generated. This is related to the irreversible capacity of both electrodes.

As the irreversible capacity difference of the electrodes is large, the initial efficiency of a cathode decreases, and the energy density gradually deceases during the operation of a battery, and thus the cycle life of a battery may decrease.

DISCLOSURE

Technical Problem

One embodiment of the present disclosure provides a cathode additive that can offset an irreversible capacity imbalance, increase the initial charge capacity of a cathode, and simultaneously inhibit the generation of gas in a battery.

Technical Solution

The advantages and characteristics of the embodiments of the present disclosure, and methods for achieving the same, will be clarified referring to the examples described below. However, the present disclosure is not limited by the examples disclosed below, and can be realized in various forms. Further, the examples are presented only for better understanding of the present disclosure by a person having ordinary knowledge in the art, and the present disclosure is defined only by the claims.

Hereinafter, unless otherwise defined, the technical terms and scientific terms used herein have meanings which a person having ordinary knowledge commonly understands. In addition, repeated explanations of the technical constructions and actions identical to those of the prior art will be omitted.

Throughout the specification, when a part is "connected" with another part, it not only includes the case wherein they are "directly connected", but also includes the case wherein they are "electrically connected" with another device therebetween.

Throughout the specification, when a member is positioned "on" another member, it not only includes the case wherein a member contacts another member, but also includes a case wherein still another member exists between the two members. Throughout the specification, when a part "comprises" a constructional element, unless described to the contrary, other constructional elements are not excluded, but other constructional elements can be further included.

Terms indicating a degree such as "about", "substantially", and the like used throughout the specification, when a tolerance of preparation and material unique to the mentioned meaning is presented, are used as a meaning close to the numerical value, and are used to prevent the disclosure from mentioning an exact or absolute numerical value for understanding of the present disclosure being unreasonably used by an unprincipled infringer.

Throughout the specification, the term "~step" or "step of~" does not mean a "step for~".

Throughout the specification, the term "combination(s) thereof" included in the expression of a Markush type means mixtures or combinations of one or more selected from the group consisting of the constructional elements described in the expression of a Markush type, and means to include one or more selected from the group consisting of the constructional elements.

Throughout the specification, the description "A and/or B" means "A or B, or A and B".

Cathode Additive

One embodiment of the present disclosure provides a cathode additive including: a core, the composition of which is represented by the following Chemical Formula 1; and a coating layer positioned on the surface of the core, and including a phosphorus (P) compound:

$$\{_x(Li_{2+a}Ni_bM_{1-b}O_{2+c})\}\cdot\{_y(NiO)\}\cdot\{_z(Li_2O)\} \quad \text{[Chemical Formula 1]}$$

wherein, in Chemical Formula 1,

M is one or more metal atoms forming a divalent cation or a trivalent cation, for example, one or more metal element selected from the group including Cu, Mg, Pt, and Al, $-0.2 \leq a \leq 0.2$, $0.5 \leq b \leq 1.0$, $-0.2 \leq c \leq 0.2$, $0.7 \leq x \leq 1.0$, $0 < y \leq 0.15$, $0 < z \leq 0.15$, and $x+y+z=1$.

In the cathode additive of one embodiment, the core may include an excessive amount of lithium compared to common cathode active material including about 1 mol of lithium, and may irreversibly discharge lithium during the initial charge/discharge of a battery.

Meanwhile, in the cathode additive of one embodiment, the coating layer may remove lithium by-products ($Li_2CO_3$, LiOH, etc.) remaining on the surface of the core, and thus inhibit the generation of a gas during the continuous charge/discharge process of a battery.

Thus, the cathode additive of one embodiment may be applied in a cathode together with a cathode active material to offset the irreversible capacity imbalance of two electrodes during the initial charge/discharge of a battery, and increase the initial charge capacity of a cathode, and simultaneously contribute to the inhibition of gas generation in a battery.

Hereinafter, each construction of the core and coating layer included in the cathode additive of one embodiment will be explained in detail.

Coating Layer

In the cathode additive of one embodiment, the core has high reactivity, and thus can react with carbon dioxide ($CO_2$), moisture ($H_2O$), etc. in a common air atmosphere to form lithium by-products such as lithium carbonate ($Li_2CO_3$), lithium hydroxide (LiOH), etc.

However, the lithium by-products cannot participate in an electrochemical reaction in a battery, and generate a gas in a battery to decrease the initial capacity and the initial charge/discharge efficiency of a battery.

Thus, there is a need to remove the lithium by-products so as to inhibit the deterioration of the initial properties of a battery. However, if a core is simply washed, there is a concern that such washing could remove potentially desirable materials in the core, such as $Li_2O$, together with the lithium by-products, and further, there is a possibility that the by-products may detrimentally increase in a drying process after washing. Such an increase could be caused by a decay of the core material back into the by-products. Thus, there is a limit in the ability to remove the lithium by-products, as they may recontaminate the core material after washing, etc.

Thus in the cathode additive of one embodiment, the core is not simply washed, but a coating layer is formed on the surface of the core, thereby converting the lithium by-products into other compounds that cannot generate a gas in the process of forming the coating layer, while protecting an important factor ($Li_2O$) which may already be present in the core. Although more details will be explained below, in one embodiment, the coating layer may be formed on the surface of the core by heat treating a mixture of the core and ammonium phosphate ($NH_4H_2PO_4$).

For example, in the process of forming the coating layer, not only may the ammonium phosphate ($NH_4H_2PO_4$) be coated on the surface of the core, but also a coating layer in the form of $Li_3PO_4$ that is formed by the reaction of the ammonium phosphate ($NH_4H_2PO_4$) and the lithium by-products, for example, LiOH, may be formed The compounds that can be included in the coating layer commonly include phosphorus (P), and may be compounds that cannot generate a gas in a battery. The phosphorus (P) compound included in the coating layer and the raw materials thereof do not react with the important factor ($Li_2O$) for the core, and can prevent the direct contact of the core with an electrolyte to inhibit side reactions.

Meanwhile, the coating layer may be included in the content of 500 to 9000 ppm in the total amount of the cathode additive. It may be adjusted by controlling the content of ammonium phosphate to 500 to 9000 ppm, based on the total amount of the mixture of the core and the ammonium phosphate. Specifically, by controlling the content of the ammonium phosphate to 500 to 9000 ppm, 1000 to 8000 ppm, 1000 to 7000 ppm, 1000 to 6000 ppm, 1000 to 5000 ppm, 1000 to 4000 ppm, 1000 to 3000 ppm, etc., based on the total amount of the mixture of the core and the ammonium phosphate, the content of the coating layer in the total amount of the cathode additive may be easily adjusted to 500 to 9000 ppm, 1000 to 8000 ppm, 1000 to 7000 ppm, 1000 to 6000 ppm, 1000 to 5000 ppm, 1000 to 4000 ppm, 1000 to 3000 ppm, etc.

Core

Meanwhile, in the cathode additive of one embodiment, the core may include a lithium nickel oxide represented by the following Chemical Formula 1-1, nickel oxide (NiO), and lithium oxide ($Li_2O$), and may have the whole composition represented by the above Chemical Formula 1:

[Chemical Formula 1-1]

wherein, in Chemical Formula 1-1,

M, a, b, and c are as defined in Chemical Formula 1.

It may be prepared using a nickel-based oxide (($Ni_dM_{1-d}$)$O_x$) (wherein M is a metal atom forming a divalent cation or a trivalent cation, $0.5 \leq d \leq 1.0$ and $1.8 \leq x \leq 2.2$) and lithium oxide ($Li_2O$) as raw materials.

In one embodiment, theoretically, when mixing the nickel-based oxide (($Ni_dM_{1-d}$)$O_x$) and the lithium oxide ($Li_2O$) at a stoichiometric mole ratio of 1:1 and heat treating, the total amount mixed may react at a mole ratio of 1:1 to form the lithium nickel oxide represented by Chemical Formula 1-1, and non-reacted raw materials may not remain.

However, in a practical process, even if the nickel-based oxide (($Ni_dM_{1-d}$)$O_x$) and the lithium oxide ($Li_2O$) are mixed at a mole ratio of 1:1 and heat-treated, the total amount mixed may not react at a mole ratio of 1:1, and thus non-reacted raw materials may necessarily remain. In the studies known so far, non-reacted raw materials were handled as simple impurities and removed, and only materials having a theoretical composition (namely, the lithium nickel oxide represented by Chemical Formula 1-1) was recovered and used as a cathode additive.

As such, in the present study, unlike the studies known so far, non-reacted raw materials are not removed, but are recovered together with a material having a theoretical composition (namely, the lithium nickel oxide represented by Chemical Formula 1-1), and used as the core. Such a core, due to the existence of the non-reacted raw materials, particularly, lithium oxide ($Li_2O$), can provide extra Li for a cathode, and further increase the initial charge capacity of a cathode, which was unexpected and to the contrary of the then-current understanding in the art.

Specifically, the core may be obtained by mixing a nickel-based oxide and lithium oxide ($Li_2O$) at a stoichiometric mole ratio of 1:1.02 to 1:0.98 and then heat treating, without the removal process of non-reacted raw materials.

In the resulting core, the lithium nickel oxide represented by Chemical Formula 1-1, the nickel oxide (NiO), and the lithium oxide ($Li_2O$) may be respectively detected as crystalloids by XRD (X-Ray Diffraction) by Fe Kα X-ray (X-rα).

That is, if the core is analyzed qualitatively and quantitatively using XRD (X-Ray Diffraction) by Fe Kα X-ray (X-rα), each existence of the lithium nickel oxide represented by Chemical Formula 1-1, the nickel oxide (NiO), and the lithium oxide ($Li_2O$) and each amount, may be confirmed.

Specifically, by XRD (X-Ray Diffraction) measurement by Fe Kα X-ray (X-rα), the appearance of a main peak in at least one of a range in which 2θ is 30 to 35°, a range in which 2θ is 35 to 40°, or a range in which 2θ is 55 to 60° may be considered to be due to the lithium oxide ($Li_2O$).

It may appear with intensity of greater than 0 and equal to or less than 15, greater than 0 and equal to or less than 14, greater than 0 and equal to or less than 13, or greater than 0 and equal to or less than 12, when the intensity of the main peak of the lithium nickel oxide represented by Chemical Formula 1-1 is considered as 100 (Ref.). Thus, it can be seen that the content of lithium oxide ($Li_2O$) in the total amount of the core (100 wt %) is greater than 0 wt % and equal to or less than 15 wt %, greater than 0 wt % and equal to or less than 14 wt %, greater than 0 wt % and equal to or less than 13 wt %, or, greater than 0 wt % and equal to or less than 12 wt %.

Further, by XRD (X-Ray Diffraction) measurement by Fe Kα X-ray (X-rα), the appearance of a main peak in at least one of a range in which 2θ is 35 to 40°, a range in which 2θ is 40 to 45°, or a range in which 2θ is 50 to 550 may be considered to be due to the nickel oxide (NiO).

It may appear with intensity of greater than 0 and equal to or less than 15, greater than 0 and equal to or less than 14, greater than 0 and equal to or less than 13, or greater than 0 and equal to or less than 12, when the intensity of the main peak of the lithium nickel oxide represented by Chemical Formula 1-1 is considered as 100 (Ref.). Thus, it can be seen that the content of nickel oxide (NiO) in the total amount of the core (100 wt %) is greater than 0 wt % and equal to or less than 15 wt %, greater than 0 wt % and equal to or less than 14 wt %, greater than 0 wt % and equal to or less than 13 wt %, or greater than 0 wt % and equal to or less than 12 wt %.

Finally, by XRD (X-Ray Diffraction) measurement by Fe Kα X-ray (X-rα), a main peak may appear in at least one a range in which 2θ is 18 to 21°, a range in which 2θ is 24 to 27°, or a range in which 2θ is 43 to 46°. Such a main peak may appear by an orthorhombic crystal structure with a point group of Immm, and it may be due to the lithium nickel oxide represented by Chemical Formula 1-1.

The content may be calculated by subtracting the content of the lithium oxide ($Li_2O$) and the content of the nickel oxide (NiO) from the total amount of the core (100 wt %).

Comprehensively considering the results of the quantitative analysis and the qualitative analysis of this embodiment, it can be seen that the lithium nickel oxide represented by Chemical Formula 1-1, the nickel oxide (NiO), and the lithium oxide ($Li_2O$) are included in the core, and the composition is as shown in Chemical Formula 1. Specifically, in Chemical Formula 1, x, y, and z are respectively related to the weight ratios of the lithium nickel oxide represented by Chemical Formula 1-1, the nickel oxide (NiO), and the lithium oxide ($Li_2O$).

For example, in Chemical Formula 1, $0.7 \leq x < 1.0$, $0 < y \leq 0.15$, and $0 < z \leq 0.15$; $0.72 \leq x < 1.0$, $0 < y \leq 0.14$, and $0 < z \leq 0.14$; $0.74 \leq x \leq 1.0$, $0 < y \leq 0.13$, and $0 < z \leq 0.13$; $0.74 \leq x < 1.0$, $0 < y \leq 0.13$, and $0 < z \leq 0.13$; or $0.76 \leq x < 1.0$, $0 < y \leq 0.12$, and $0 < z \leq 0.12$. Although synergistic effects may be obtained by each component in the above ranges, these ranges are no more than examples, and the present disclosure is not limited thereby.

In the core of this embodiment, the forms of existence of the lithium nickel oxide represented by Chemical Formula 1-1, the nickel oxide (NiO), and the lithium oxide ($Li_2O$) are not specifically limited. For example, they may exist in the form of a composite in which the nickel oxide (NiO) particles and the lithium oxide ($Li_2O$) particles may be attached on the surface of the lithium nickel oxide represented by Chemical Formula 1-1, or may exist in the form of a mixture in which the nickel oxide (NiO) particles and the lithium oxide ($Li_2O$) particles are not attached to the lithium nickel oxide represented by Chemical Formula 1-1, but separately exist. Here, the "particles" may be primary particles or secondary particles formed by the agglomeration of the primary particles.

Meanwhile, the core may irreversibly discharge lithium ions and oxygen at the initial charge voltage of a battery, for example, 2.5 to 4.25 V (vs. Li/Li+), and thereafter, at least part of the composition may be converted into the following Chemical Formula 2.

$$\{_x(Li_{1+a}Ni_bM_{1-b}O_{2+c})\} \cdot \{_y(NiO)\} \cdot \{_z(Li_2O)\} \quad \text{[Chemical Formula 2]}$$

(In Chemical Formula 2, M, a, b, c, x, y, and z are as defined in Chemical Formula 1, respectively.)

In the core converted into Chemical Formula 2, $Li_{2+a}Ni_bM_{1-b}O_{2+c}$ is capable of reversible intercalation/deintercalation of lithium ions, like common cathode active materials. In this embodiment, on the surface of the core converted into Chemical Formula 2, the coating layer may still exist.

Thus, the cathode additive of one embodiment may be utilized as additives for compensating the initial irreversible capacity of an anode, and as an active material enabling the reversible intercalation/deintercalation of lithium. However, the core converted into Chemical Formula 2 may have a small reversible capacity compared to common cathode active materials, specifically, a reversible capacity of 300 to 350 mAh/g, due to the Li content and structural limitation. Thus, in case the initial performance of a battery is to be improved while simultaneously securing long term life cycle characteristics, cathode active materials may be mixed with the cathode additive of one embodiment at an appropriate mix ratio according to the aimed battery properties.

A Method for Preparing a Cathode Additive

Another embodiment of the present disclosure provides a method for preparing a cathode additive including the steps of: preparing a nickel-based oxide represented by the following Chemical Formula 3; heat treating a mixture of the nickel-based oxide and lithium oxide ($Li_2O$) to obtain a core; adding an ammonium phosphate ($NH_4H_2PO_4$) to the formed core; and heat treating the mixture of the core and ammonium phosphate ($NH_4H_2PO_4$) to form a coating layer on the surface of the core. By the preparation method, the above-explained cathode additive may be obtained.

$$(Ni_dM_{1-d})O_2 \quad \text{[Chemical Formula 3]}$$

In Chemical Formula 3,

M is a metal atom forming a divalent cation or a trivalent cation, and $0.5 \leq d \leq 1.0$.

In the preparation method of one embodiment, the step of preparing the nickel-based oxide represented by Chemical Formula 3 may be a step of heat treating nickel oxide ($Ni(OH)_2$) alone, or a mixture of nickel oxide ($Ni(OH)_2$) and an M-containing compound.

The heat treatment of nickel oxide ($Ni(OH)_2$) alone, or a mixture of nickel oxide ($Ni(OH)_2$) and an M-containing compound, may be conducted at a temperature range of 500 to 700° C. for 5 to 20 hours.

In this step, in case the nickel oxide ($Ni(OH)_2$) is heat treated alone, a nickel oxide ($NiO_x$) of Chemical Formula 3 wherein d is 0 may be formed. On the contrary, in case the mixture of nickel oxide ($Ni(OH)_2$) and an M-containing compound is heat treated, an M-doped nickel-based oxide ($[Ni_dM_{1-d}]O_x$) wherein d is not 0 may be formed.

In the preparation method of one embodiment, the step of heat treating a mixture of the nickel-based oxide and lithium oxide ($Li_2O$) may include mixing the nickel-based oxide and the lithium oxide at a mole ratio of 1:1 (±0.02), and heat treating the mixture at a temperature range of 600 to 800° C. for 10 to 20 hours under an inert atmosphere.

When heat treating the mixture of the nickel oxide and lithium oxide ($Li_2O$), the total amount mixed may not react at a mole ratio of 1:1, and a part of the nickel-based oxide (($Ni_dM_{1-d})O_x$) and a part of the lithium oxide ($Li_2O$) may react to form the lithium nickel oxide represented by the above Chemical Formula 1-1, and non-reacted raw materials may remain. The whole composition of the product obtained thereby and the effects are as explained above.

Meanwhile, in the preparation method of one embodiment, in the step of forming a coating layer on the surface of the core, a coating layer including a phosphorus (P) compound may be formed. Specifically, not only may ammonium phosphate ($NH_4H_2PO_4$) be formed on the surface of the core, but also a coating layer in the form of lithium phosphate ($Li_3PO_4$) formed by the reaction of the ammonium phosphate ($NH_4H_2PO_4$) and the lithium by-products, for example, LiOH, may be formed.

Here, in this particular example, the total amount of the mixed raw materials (namely, the core and the ammonium phosphate), the amount of the ammonium phosphate may be controlled to 500 to 9000 ppm. Thereby, the content of the coating layer in the total amount of the cathode additive may be controlled to 500 to 9000 ppm.

In this range, lithium by-products ($Li_2CO_3$, LiOH, etc.) remaining on the surface of the core, particularly by-products in the form of LiOH, may be effectively reacted and/or removed, thus inhibiting the generation of gas in the continuous charge/discharge process of a battery. However, this range is no more than an example, and the cathode additive of one embodiment is not limited thereby.

Cathode Mixture

Yet another embodiment of the present disclosure provides a cathode mixture including the above explained cathode additive, and a cathode active material.

Since the cathode mixture of one embodiment uses the above-explained cathode additive, the initial irreversible capacity of an anode may be decreased compared to the case wherein the cathode additive is not used, thereby increasing the initial efficiency of a cathode.

In the total amount (100 wt %) of the cathode mixture of one embodiment, the cathode additive may be used in the content of 1 to 30 wt %. Specifically, when the cathode additive is mixed in the above range, the initial irreversible capacity of an anode may be sufficiently decreased during the initial charge/discharge of a battery (i.e., during the $1^{st}$ cycle), and then reversible intercalation and deintercalation of lithium ions may be stably achieved by the cathode active material during the subsequent charge/discharge (i.e., the $2^{nd}$ and higher cycles).

In addition, the cathode mixture of one embodiment may be realized according to the particulars commonly known in the art. Hereinafter, although particulars commonly known in the art will be briefly presented, these are no more than examples, and the cathode mixture of one embodiment is not limited thereby.

The cathode active material is not specifically limited as long as it is a material capable of reversible intercalation and deintercalation of lithium ions. For example, it may include one or more composite oxides of: a metal of cobalt, manganese, nickel, or a combination thereof, and lithium.

More specifically, as the cathode active material, a compound represented by any one of the following Chemical Formulas may be used: $Li_aA_{1-b}R_bD_2$ (wherein $0.90 \leq a \leq 1.8$ and $0 \leq b \leq 0.5$); $Li_aE_{1-b}R_bO_{2-c}D_\alpha$ (wherein $0.90 \leq a \leq 1.8$, $0 \leq b \leq 0.5$, and $0 \leq c \leq 0.05$); $LiE_{2-b}R_bO_{4-c}D_c$ (wherein $0 \leq b \leq 0.5$ and $0 \leq c \leq 0.05$); $Li_aNi_{1-e-c}Co_bR_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bR_cO_{2-\alpha}Z_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bR_cO_{2-\alpha}Z_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bR_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bR_cO_{2-\alpha}Z_\alpha$ (wherein $0.90 \leq a \leq 1.8$, $0 \leq b \leq 0.5$, $0 \leq c \leq 0.05$, and $0 < \alpha < 2$이다); $Li_aNi_{1-b-c}Mn_bR_cO_{2-\alpha}Z_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_b Co_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_a CoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2GbO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $FePO_4$.

In the chemical formulas, A is Ni, Co, Mn, or a combination thereof; R is Al, Ni, Co, Mn, Cr, Fe, Mg, Sr, V, a rare earth atom, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The compound may have a coating layer on the surface, or the compound may be used in combination with a compound having a coating layer. The coating layer may include, as a coating element compound, an oxide or hydroxide of the coating element, an oxyhydroxide of the coating element, an oxycarbonate of the coating element, or a hydroxycarbonate of the coating element. A compound making up the coating layer may be amorphous or crystalline. As the coating element included in the coating layer, Mg, Al, Co, K, Na, Ca, Si, Ti, V, Sn, Ge, Ga, B, As, Zr, or a mixture thereof may be used. As the process of forming the coating layer, any coating method may be used as long as it can coat these elements on the compound without adversely influencing the properties of the cathode active material (for example, spray coating, dipping, etc.), and since this can be easily understood by one or ordinary knowledge in the art, the detailed explanations thereof will be omitted.

The cathode mixture of one embodiment may further include a conductive material, a binder, or a mixture thereof. The conductive material is used to provide conductivity to an electrode, and any materials may be used as long as they are electronically conductive materials without causing chemical changes, and for example, metal powders or metal fibers such as natural graphite, artificial graphite, carbon black, acetylene black, Ketjen black, carbon fiber, copper, nickel, aluminum, silver, etc. may be used, and one kind or one or more kinds of conductive materials such as polyphenylene derivatives, etc. may be used in combination.

The binder performs the functions for sufficiently attaching the cathode active material particles, and sufficiently attaching the cathode active material to a current collector, and as representative examples, polyvinyl alcohol, carboxymethyl cellulose, hydroxypropyl cellulose, diacetyl cellulose, polyvinyl chloride, carboxylated polyvinyl chloride, polyvinyl fluoride, an ethylene oxide-containing polymer, polyvinyl pyrrolidone, polyurethane, polytetrafluoroethylene, polyvinylidene fluoride, polyethylene polypropylene styrene-butadiene rubber, acrylated styrene-butadiene rubber, an epoxy resin, nylon, etc. may be used, but are not limited thereto.

Lithium Secondary Battery

Yet another embodiment of the present disclosure provides a lithium secondary battery including a cathode including the above-explained cathode mixture; an electrolyte; and an anode.

Since the lithium secondary battery uses the above-explained cathode additive together with a cathode active material in a cathode, the initial irreversible capacity of an anode may be decreased, the initial efficiency of a cathode may be increased, and a decrease in energy density during the operation may be inhibited, such that an excellent cycle life characteristic may be exhibited.

In the lithium secondary battery of one embodiment, particulars other than the above-explained cathode additive and cathode mixture may be realized according to particulars commonly known in the art.

Hereinafter, although particulars commonly known in the art will be briefly presented, the cathode mixture of one embodiment is not limited thereby.

The cathode may include a cathode current collector, and a cathode mixture layer including the above-explained cathode mixture, positioned on the cathode current collector.

Specifically, the cathode may be prepared by coating an electrode mixture of a cathode active material, a conductive material, and/or a binder on the cathode current collector and then drying, and if necessary, a filler may be further added to the mixture.

The cathode current collector may be generally formed with a thickness of 3~500 μm. Such a cathode current collector is not specifically limited as long as it has high conductivity without inducing chemical changes in a battery. For example, stainless steel, aluminum, nickel, titanium, baked carbon, or aluminum, or stainless steel of which surface is treated with carbon, nickel, titanium, silver, etc. may be used. The collector may have fine unevenness on the surface to increase adhesion of the cathode active material, and it may be in various forms such as a film, a sheet, a foil, a net, a porous body, a foamed body, a non-woven fabric body, etc.

The conductive material is commonly added in the content of 1 to 50 wt %, based on the total weight of the mixture including the cathode active material. Such conductive material is not specifically limited as long as it has conductivity without inducing chemical changes in a battery, and for example, graphite such as natural graphite or artificial graphite; carbon black such as carbon black, acetylene black, Ketjen black, channel black, furnace black, lamp black, summer black, etc.; a conductive fiber such as a carbon fiber, a metal fiber, etc.; a metal powder such as fluorinated carbon, aluminum, nickel powder, etc.; conductive whiskers such as zinc oxide, potassium titanate, etc.; a conductive metal oxide such as titanium oxide, etc.; or a conductive material such as polyphenylene derivatives, etc. may be used.

Meanwhile, an elastic graphite-based material may be used as the conductive material, and it may be used in combination with the above-described materials.

The binder is a component assisting in the bonding of the active material and the conductive material and the bonding to a current collector, and commonly, it is added in the content of 1 to 50 wt %, based on the total weight of the mixture including the cathode active material. Examples of the binder may include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, an ethylene-propylene-diene terpolymer (EPDM), sulfonated EPDM, styrene butylene rubber, fluorine-containing rubber, various copolymers, etc.

The filler is selectively used for a component for inhibiting the expansion of a cathode, and is not specifically limited as long as it is a fibrous material without inducing chemical changes in a battery, and for example, an olefin-based polymer such as polyethylene, polypropylene, etc.; and fibrous materials such as glass fiber, carbon fiber, etc. may be used.

The anode includes a current collector and an anode active material layer formed on the current collector, and the anode active material layer may include an anode active material.

As the anode active material, one or more selected from the group consisting of a carbon-based anode active material, a lithium metal, a lithium alloy, Si, $SiO_x$ ($0<x<2$), a Si—C composite, a Si-Q alloy (wherein Q is an alkali metal, an alkali earth metal, atoms of Group 13 to 16, a transition metal, a rare earth atom, or a combination thereof, provided that it is not Si), Sn, $SnO_2$, a Sn—C composite, and Sn—R (wherein R is an alkali metal, an alkali earth metal, atoms of Groups 13 to 16, a transition metal, a rare earth metal, or a combination thereof, provided that it is not Sn) may be used.

The anode current collector may be generally formed with a thickness of 3~500 μm. Such an anode current collector is not specifically limited as long as it has conductivity without inducing chemical changes in a battery, and for example, copper, stainless steel, aluminum, nickel, titanium, baked carbon, or copper, stainless steel of which surface is treated with carbon, nickel, titanium, silver, etc., or an aluminum-cadmium alloy, etc. may be used. Further, like the cathode current collector, fine unevenness may be formed on the surface to increase the bonding force of the anode active material, and it may be in various forms such as a film, a sheet, a foil, a net, a porous body, a foamed body, a non-woven fabric body, etc.

The lithium secondary battery of one embodiment may be a lithium ion battery, a lithium ion polymer battery, or a lithium polymer battery according to the kind of electrolyte and/or the kind of a separator.

When the lithium secondary battery of one embodiment is a lithium ion battery applying a liquid electrolyte, the liquid electrolyte may be impregnated in a separator. The separator is interposed between a cathode and an anode, and a thin insulating film having high ion permeability and mechanical strength may be used therefor. The pore diameter of the separator is generally 0.01~10 μm, and the thickness is generally 5~300 μm. As such a separator, for example, an olefin-based polymer such as a chemical resistant and hydrophobic polypropylene, etc.; or a sheet or non-woven fabric, etc. made of glass fiber or polyethylene, etc. may be used. In case a solid electrolyte such as a polymer is used as the electrolyte, the solid electrolyte may also serve as a separator.

The liquid electrolyte may be non-aqueous electrolyte containing lithium salt. The lithium salt-containing, non-aqueous electrolyte is composed of a non-aqueous electrolyte and lithium, and as the non-aqueous electrolyte, non-aqueous organic solvents, organic solid electrolytes, inorganic solid electrolytes, etc. may be used, but is not limited thereto.

As examples of the non-aqueous electrolytic solution, mention may be made of aprotic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2- imidazolidinone, propylene carbonate derivatives, tetrahydrofuran derivatives, ether, methyl propionate, ethyl propionate, etc. may be used.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulfates of lithium, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, a lower aliphatic lithium carboxylic acid, lithium tetraphenyl borate, and imide.

Additionally, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the lithium salt-containing non-aqueous electrolyte. According to circumstances, in order to impart incombustibility, the non-aqueous electrolyte may further include halogen-containing solvents, such as carbon tetrachloride and ethylene trifluoride. Furthermore, in order to improve high-temperature storage characteristics, the non-aqueous electrolyte may additionally include carbon dioxide gas, FEC (fluoro-ethylene carbonate), PRS (propene sultone), and the like.

For example, the lithium salt-containing, non-aqueous electrolyte may be prepared by adding a lithium salt such as $LiPF_6$, $LiClO_4$, $LiBF_4$, $LiN(SO_2CF_3)_2$, etc. to a mixed solvent of a solvent having a high dielectric constant such as EC or PC and a solvent having a low viscosity such as DEC, DMC, or EMC.

The lithium secondary battery of one embodiment may be realized as a battery module including the lithium secondary battery as a unit cell, a battery pack including the battery module, and a device including the battery pack as a power source.

Specific examples of the device may include an electric vehicle, a hybrid electric vehicle, a plug-in hybrid electric vehicle, and an electric power storage system, but are not limited thereto.

Advantageous Effects

According to the lithium secondary battery applying the cathode additive of one embodiment for a cathode, the initial irreversible capacity of an anode may be decreased, the initial capacity and efficiency of a cathode may be efficiently increased, and a decrease in energy density during the operation may be inhibited, such that an excellent cycle life characteristic can be exhibited.

MODE FOR CERTAIN EMBODIMENTS OF THE PRESENT DISCLOSURE

Hereinafter, the actions and effects of the present disclosure will be explained in more detail through specific examples herein. However, these examples are presented only as the illustrations of the present disclosure, and the scope of the right of the present disclosure is not limited thereby.

I. Confirmation of Advantages of a Core Including Lithium Nickel Oxide, Nickel Oxide (NiO), and Lithium Oxide ($Li_2O$)

Preparation Example 1: $\{_x(Li_2NiO_2)\} \cdot \{_y(NiO)\} \cdot \{_z(Li_2O)\}$, x=0.86, y=0.07, z=0.07, Bare (1) Preparation of a Core A nickel hydroxide precursor, $Ni(OH)_2$, was heat treated under an inert atmosphere at 600° C. for 10 hours to obtain a nickel-based oxide (NiO).

The nickel-based oxide NiO was mixed with lithium oxide ($Li_2O$) at a mole ratio ($NiO:Li_2O$) of 1:1.1, and heat treated at 680° C. (inert atmosphere) for 18 hours. At this time, the heating and cooling rates were fixed to 5° C. per minute.

After the heat treatment was finished, $\{_x(Li_2NiO_2)\} \cdot \{_y(NiO)\} \cdot \{_z(Li_2O)\}$, x=0.86, y=0.07, z=0.07 was finally obtained, which was designated as a core of Preparation Example 1.

The above chemical formula was calculated from Experimental Example 1 described below.

(2) Manufacture of a Cathode and a Lithium Secondary Battery (Coin Half-Cell)

A cathode was prepared using the core of Preparation Example 1 as a cathode additive, and a lithium secondary battery including the prepared cathode was manufactured.

Specifically, the core of Preparation Example 1 (cathode additive) $\{_{0.86}(Li_2NiO_2)\} \cdot \{_{0.07}NiO\} \cdot \{_{0.07}Li_2O\}$, conductive material (Super-P, Denka black), and a binder (PVdF) were mixed in an organic solvent (NMP) at a weight ratio of 85:10:5 (cathode additive:conductive material:binder), to prepare a cathode mixture in the form of a slurry, and then the cathode mixture was coated on an aluminum current collector, and dried in a vacuum oven at 120° C. for 30 minutes to prepare a cathode.

As a counter electrode, Li-metal was used, and as an electrolyte, a solution of 2 wt % of VC dissolved in a mixed solvent of ethylene carbonate (EC) and dimethyl carbonate (DMC) at a volume ratio of 1:2 was used.

A 2032 coin half-cell was manufactured using the above-described constructional elements, according to a common manufacturing method.

Preparation Example 2: $\{_x(Li_2NiO_2)\}\cdot\{_y(NiO)\}\cdot\{_z(Li_2O)\}$, x=0.80, y=0.10, z=0.10, Bare (1) Preparation of a Core $\{_x(Li_2NiO_2)\}\cdot\{_y(NiO)\}\cdot\{_z(Li_2O)\}$, x=0.80, y=0.10, z=0.10 was obtained by the same method as Preparation Example 1, except that the nickel-based oxide (NiO) was mixed with lithium oxide ($Li_2O$) at a mole ratio of 1:1.2, and it was designated as a core (cathode additive) of Preparation Example 2.

The above chemical formula was calculated from Experimental Example 1 described below.

(2) Manufacture of a Cathode and a Lithium Secondary Battery (Coin Half-Cell)

The cathode and lithium secondary battery of Preparation Example 2 were manufactured by the same method as Preparation Example 1, except that the core (cathode additive) of Preparation Example 2 was used instead of the core (cathode additive) of Preparation Example 1.

Preparation Example 3: $\{_x(Li_2NiO_2)\}\cdot\{_y(NiO)\}\cdot\{_z(Li_2O)\}$, x=0.76, y=0.12, z=0.12, Bare (1) Preparation of a Core $\{_x(Li_2NiO_2)\}\cdot\{_y(NiO)\}\cdot\{_z(Li_2O)\}$, x=0.76, y=0.12, z=0.12 was obtained by the same method as Preparation Example 1, except that the nickel-based oxide NiO was mixed with lithium oxide ($Li_2O$) at a mole ratio of 1:1.3, and the above chemical formula was calculated from Experimental Example 1 described below.

(2) Manufacture of a Cathode and a Lithium Secondary Battery (Coin Half-Cell)

The cathode and lithium secondary battery of Preparation Example 3 were manufactured by the same method as Preparation Example 1, except that the core (cathode additive) of Preparation Example 3 was used instead of the core (cathode additive) of Preparation Example 1.

Comparative Example 1: $_x(Li_2NiO_2)$, x=0.86, Bare (1) Preparation of Cathode Additive A cathode additive was prepared by the same method as Preparation Example 1, and then a non-reacted nickel-based oxide (NiO) and lithium oxide ($Li_2O$) were sieved through a 400 mesh sieve, to finally obtain x ($Li_2NiO_2$), x=0.86, having an orthorhombic crystal structure with a point group of Immm, which was designated as the cathode additive of Comparative Example 1.

(2) Manufacture of a Cathode and a Lithium Secondary Battery (Coin Half-Cell)

The cathode and lithium secondary battery of Comparative Example 1 were manufactured by the same method as Preparation Example 1, except that the cathode additive of Comparative Example 1 was used instead of the cathode additive of Preparation Example 1.

Experimental Example 1: XRD Analysis of the Core

For each core (cathode additive) of Preparation Examples 1 to 3 and Comparative Example 1, XRD (X-Ray Diffraction) analysis by Cu Kα X ray (X-rα) was conducted, and the results are recorded in the following Table 1.

Specifically, the lithium nickel oxide and the nickel oxide (NiO) can be detected as crystalloids, through XRD (X-Ray Diffraction) by Cu Kα X ray (X-rα).

Particularly, quantitative analysis results were obtained through the calculation of intensity after XRD (X-Ray Diffraction) analysis.

TABLE 1

|  | Structural analysis | | | | Quantitative analysis | |
| --- | --- | --- | --- | --- | --- | --- |
|  | cell parameter (Å) | | volume ($Å^3$) | crystallite size (nm) | NiO (wt %) | $Li_2O$ (wt %) |
|  | a axis | c axis | | | | |
| Comparative Example 1 | 2.779 | 9.025 | 93.98 | 182 | 0 | 0 |
| Preparation Example 1 | 2.779 | 9.026 | 94.01 | 182 | 7 | 7 |
| Preparation Example 2 | 2.779 | 9.028 | 93.96 | 205 | 10 | 10 |
| Preparation Example 3 | 2.780 | 9.028 | 93.96 | 210 | 12 | 12 |

It is already known that Comparative Example 1 has an orthorhombic crystal structure with a point group of Immm. Further, from the results of structural analysis of Table 1, it can be seen that Comparative Example 1 and Preparation Examples 1 to 3 have identical crystal structures. Thus, it can be seen that Preparation Examples 1 to 3 also include a compound represented by $Li_{2+a}Ni_bM_{1-b}O_{2+c}$.

From the results of quantitative analysis of Table 1, it can be confirmed that $Li_2O$ was not detected in Comparative Example 1. However, it can be confirmed that in Preparation Examples 1 to 3, based on the total amount (100 wt %), 7 wt % (Preparation Example 1), 10 wt % (Preparation Example 2), and 12 wt % (Preparation Example 3) of $Li_2O$ were respectively detected.

Experimental Example 2: Evaluation of the Initial Charge/Discharge Property of a Battery Applying the Core as a Cathode Additive For each battery of Preparation Examples 1 to 3 and Comparative Example 1, the initial charge/discharge property was evaluated under the following conditions. The results of evaluation are recorded in FIG. 1 and the following Table 2.

Figure 1:
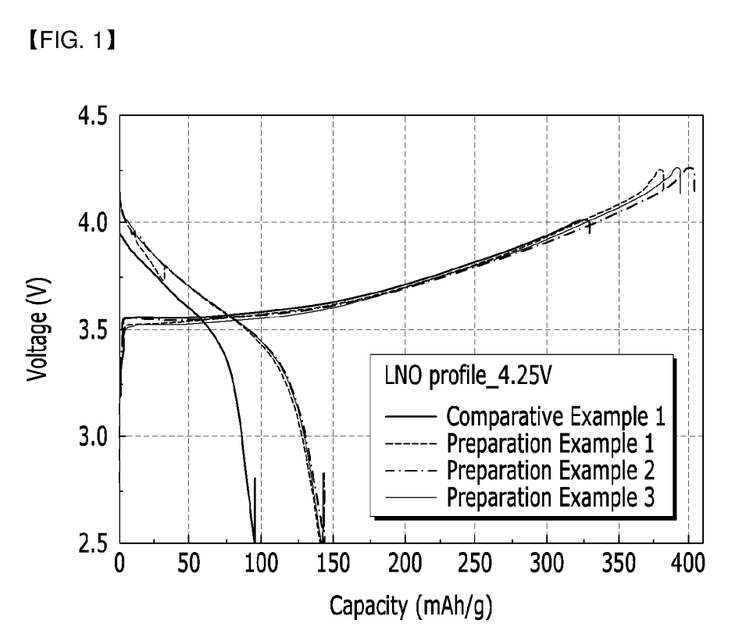
FIG. 1 is a graph showing the initial charge/discharge property of each lithium secondary battery of Preparation Examples 1 to 3, and Comparative Example 1.

Charge: 0.1 C, CC/CV, 4.25 V, 0.05 C cut-off
Discharge: 0.1 C, CC, 2.5 V, cut-off According to FIG. 1 and Table 2, it can be confirmed that in Preparation Examples 1 to 3, the initial irreversible capacity of an anode decreased, and the initial efficiency of a cathode increased, compared to Comparative Example 1.

TABLE 2

| | | Anode | | |
| --- | --- | --- | --- | --- |
| | $1^{st}$ Cycle | 0.1 C Charge (mAh/g) | 0.1 C Discharge (mAh/g) | Cathode Efficiency (%) |
| Capacity (mAh/g) | Comparative Example 1 | 329.8 | 95.2 | 28.9 |
| | Preparation Example 1 | 382 | 142.3 | 37.3 |
| | Preparation Example 2 | 394.2 | 142.8 | 36.2 |
| | Preparation Example 3 | 402.2 | 143.6 | 35.7 |

In Preparation Examples 1 to 3, in order to confirm the effect of improvement in the initial performance of a battery by the core in the cathode additive of one embodiment, a cathode mixture was prepared using each cathode additive in the same amount as the common cathode active material, and a cathode and a lithium secondary battery were manufactured.

As explained above, the core can irreversibly discharge lithium ions and oxygen at the initial charge voltage, for example, 2.5 to 4.25 V (vs. Li/Li+), and then can be converted into a composition capable of reversible intercalation and deintercalation of lithium ions. Thus, as in Preparation Examples 1 to 3, the core may be utilized as an additive for compensating the initial irreversible capacity of an anode, and also as an active material enabling reversible intercalation and deintercalation of lithium.

However, since it may have small reversible capacity compared to a common cathode active material due to the Li content and the structural limitation, in case the initial performance of a battery is to be improved while simultaneously securing the long-time cycle life characteristic, the cathode additive of one embodiment including the core may be mixed with the cathode active material at an appropriate mixing ratio according to the aimed properties of a battery.

II. Confirmation of Advantages of a Cathode Additive Including a Core Including a Lithium Nickel Oxide, a Nickel Oxide (NiO), and a Lithium Oxide ($Li_2O$); and a Phosphorus Coating Layer Example 1 (Core: Preparation Example 1, Coating Amount: 2000 ppm)

(1) Preparation of Cathode Additive $\{_x(Li_2NiO_2)\} \cdot \{_y(NiO)\} \cdot \{_z(Li_2O)\}$, x=0.86, y=0.07, z=0.07, was finally obtained by the same method as Preparation Example 1, and it was designated as the core of Example 1.

The core of Example 1 and ammonium phosphate ($NH_4H_2PO_4$) were mixed, and the mixture was heat treated under an inert atmosphere of 700° C. for 10 hours to obtain a cathode additive of Example 1.

During the mixing, the amount of the ammonium phosphate was adjusted to 2000 ppm, based on the total amount of the mixture.

(2) Manufacture of a Cathode and a Lithium Secondary Battery (Coin Half-Cell)

The cathode and lithium secondary battery of Example 1 were manufactured by the same method as Preparation Example 1, except that the cathode additive of Example 1 was used instead of the core (cathode additive) of Preparation Example 1.

Example 2 (Core: Preparation Example 1, Coating Amount: 500 ppm)

(1) Preparation of a Cathode Additive

The cathode additive of Example 2 was obtained by the same method as Example 1, except that while mixing the core of Preparation Example 1 and ammonium phosphate, the amount of the ammonium phosphate was adjusted to 500 ppm, based on the total amount of the mixture.

(2) Manufacture of a Cathode and a Lithium Secondary Battery (Coin Half-Cell)

The cathode and lithium secondary battery of Example 2 were manufactured by the same method as Example 1, except that the cathode additive of Example 2 was used instead of the core (cathode additive) of Example 1.

Example 3 (Core: Preparation Example 1, Coating Amount: 4000 ppm)

(1) Preparation of Cathode Additive

The cathode additive of Example 3 was obtained by the same method as Example 1, except that while mixing the core of Preparation Example 1 and ammonium phosphate, the amount of the ammonium phosphate was adjusted to 4000 ppm, based on the total amount of the mixture.

(2) Manufacture of a Cathode and a Lithium Secondary Battery (Coin Half-Cell)

The cathode and lithium secondary battery of Example 3 were manufactured by the same method as Example 1, except that the cathode additive of Example 3 was used instead of the core (cathode additive) of Example 1.

Example 4 (Core: Preparation Example 1, Coating Amount: 8000 ppm)

(1) Preparation of Cathode Additive

The cathode additive of Example 4 was obtained by the same method as Example 1, except that while mixing the core of Preparation Example 1 and ammonium phosphate, the amount of the ammonium phosphate was adjusted to 8000 ppm, based on the total amount of the mixture.

(2) Manufacture of a Cathode and a Lithium Secondary Battery (Coin Half-Cell)

The cathode and lithium secondary battery of Example 4 were manufactured by the same method as Example 1, except that the cathode additive of Example 4 was used instead of the core (cathode additive) of Example 1.

Example 5 (Core: Preparation Example 2, Coating Amount: 2000 ppm)

(1) Preparation of Cathode Additive

The cathode additive of Example 5 was obtained by the same method as Example 1, except that the core of Preparation Example 2 was used instead of the core of Preparation Example 1.

(2) Manufacture of a Cathode and a Lithium Secondary Battery (Coin Half-Cell)

The cathode and lithium secondary battery of Example 5 were manufactured by the same method as Example 1, except that the cathode additive of Example 5 was used instead of Example 1.

Example 6 (Core: Preparation Example 3, Coating Amount: 2000 ppm)

(1) Preparation of Cathode Additive

The cathode additive of Example 6 was obtained by the same method as Example 1, except that the core of Preparation Example 3 was used instead of the core of Preparation Example 1.

(2) Manufacture of a Cathode and a Lithium Secondary Battery (Coin Half-Cell)

The cathode and lithium secondary battery of Example 6 were manufactured by the same method as Example 1, except that the cathode additive of Example 6 was used instead of the cathode additive of Example 1.

Experimental Example 3: Confirmation of the Formation of a Coating Layer and the Constituents For the cathode additive of Example 1, in order to confirm whether or not a coating layer was formed on the surface of the core of Preparation Example 1, and if formed, to confirm the components, XPS analysis was conducted.

More specifically, as the result of measuring binding energy for the cathode additive of Example 1 by XPS analysis, a peak was detected at about 134 eV. This corresponds to the binding energy of $Li_3PO_4$ known in the art.

Thus, it can be seen that in the cathode additive of Example 1, through the process of forming a coating layer using $NH_4H_2PO_4$ as the raw material for coating, a lithium by-product LiOH existing on the surface of the core of Preparation Example 1 and $NH_4H_2PO_4$ reacted to form a coating layer including $Li_3PO_4$ on the surface of the core.

Although only the cathode additive of Example 1 was confirmed, it is inferred that a coating layer of the same component as Example 1 is formed on the surface of each core of Examples 2 to 6 which use the same raw materials and processes as Example 1, and only the coating amounts are different.

Experimental Example 4: Evaluation of the Properties of Li by-Product Reduction According to the Formation of a Coating Layer For each cathode additive of Examples 1 to 6 and each core of Preparation Examples 1 to 3 and Comparative Example 1, the initial pH and the content of Li by-products remaining on the surface were measured. The measurement results are shown in the following Table 3.

The initial pH was measured by a pH titration method, wherein 10 g of each cathode additive was introduced into 100 ml of $H_2O$, and the mixture was stirred for 5 minutes and then titrated with 0.1N HCl. Based on the inflection point that first appeared during the pH titration, the content of the base was measured as the content of LiOH, and the content of the total Li by-products was measured, and then the content of $Li_2CO_3$ was calculated by subtracting the content of LiOH from the content of the total Li by-products.

Here, each content of LiOH and $Li_2CO_3$ and the total content of these lithium by-products are based on the total amount (100 wt %) of the cathode additive or core.

From Table 3 it can be seen that although the content of lithium by-products increases as the content of $Li_2O$ in the core increases, by forming a phosphorus (P) compound as in each cathode additive of Example 1 to 6, lithium by-products can be reduced.

Moreover, in Examples 1 to 6, it can be seen that as the coating amount of a phosphorus (P) compound increases, lithium by-products can be more effectively reduced.

Figure 2:
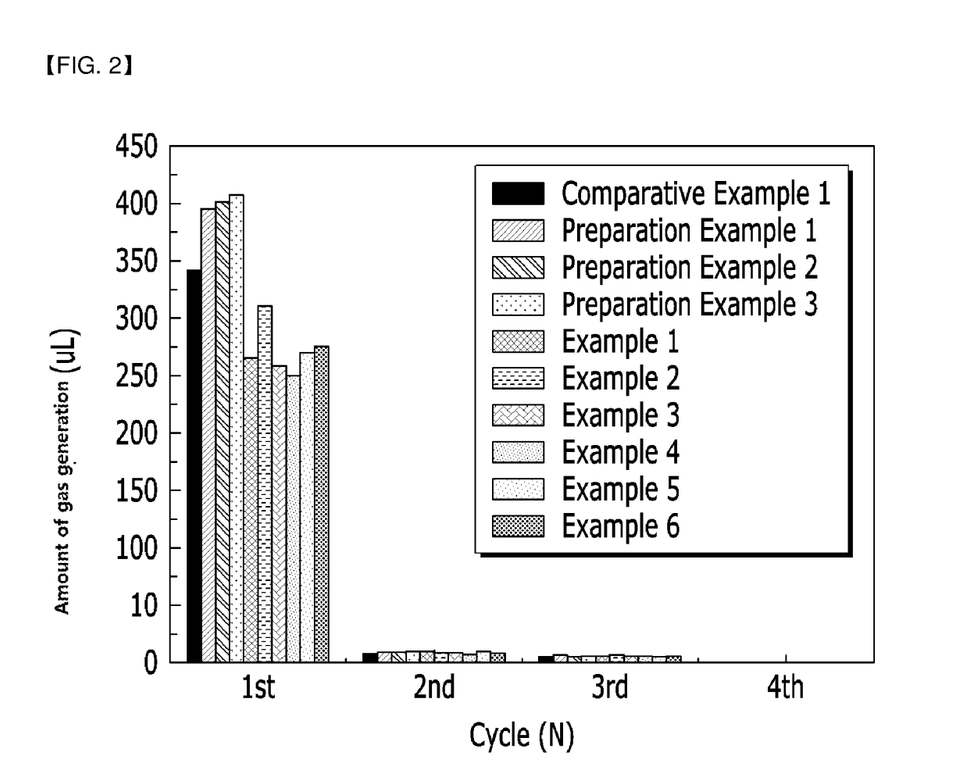
FIG. 2 is a graph measuring and recording the amount of gas generation according to the charge/discharge cycle (1st~4th cycle), for each battery of Examples 1 to 8 and each battery of Preparation Examples 1 to 3 and Comparative Example 1.

Experimental Example 5: Evaluation of the Properties of Reducing Battery Gas Generation According to the Formation of a Coating Layer For each battery of Examples 1 to 6, Preparation Examples 1 to 3, and Comparative Example 1, the amount of gas generation during the $1^{st}$ cycle charge and the amount of gas generation according to charge/discharge cycles ($1^{st}$~$4^{th}$ cycle) were measured under the following conditions. Specifically, using a differential electrochemical mass spectrometer (DEMS), gas pressure during the charging of each battery was measured in real time.

Charge: 0.1 C, CC/CV, 4.25 V, 0.05 C cut-off

Discharge: 0.1 C, CC, 2.5 V, cut-off

The measurement results are described in the following Table 4 and shown in FIG. 2. As illustrated in Table 4, the phosphorus (P) coating limits gas generation.

TABLE 3

| | Composition of additives | | excess Li | | | |
|---|---|---|---|---|---|---|
| | Core ($\{_x(Li_2NiO_2)\}\cdot\{_y(NiO)\}\cdot\{_z(Li_2O)\}$) | Coating amount (ppm) | initial pH | LiOH (wt %) | $Li_2CO_3$ (wt %) | Total ex. Li (wt %) |
| Comparative Example 1 | x = 0.86, y = 0, z = 0 | — | 12.13 | 3.650 | 0.432 | 4.082 |
| Preparation Example 1 | x = 0.86, y = 0.07, z = 0.07 | — | 12.45 | 3.808 | 0.451 | 4.259 |
| Preparation Example 2 | x = 0.80, y = 0.10, z = 0.10 | — | 12.47 | 3.987 | 0.456 | 4.443 |
| Preparation Example 3 | x = 0.76, y = 0.12, z = 0.12 | — | 12.49 | 4.013 | 0.459 | 4.472 |
| Example 1 | Preparation Example 1; x = 0.86, y = 0.07, z = 0.07 | 2000 | 12.24 | 1.414 | 0.220 | 1.634 |
| Example 2 | | 500 | 12.28 | 2.015 | 0.240 | 2.255 |
| Example 3 | | 4000 | 12.21 | 1.398 | 0.218 | 1.616 |
| Example 4 | | 8000 | 12.19 | 1.367 | 0.205 | 1.572 |
| Example 5 | Preparation Example 2; x = 0.80, y = 0.10, z = 0.10 | 2000 | 12.25 | 1.426 | 0.225 | 1.681 |
| Example 6 | Preparation Example 3; x = 0.76, y = 0.12, z = 0.12 | 2000 | 12.24 | 1.429 | 0.229 | 1.658 |

TABLE 4

| Charge/Discharge | Gas generation amount (uL) | | | | | | | |
|---|---|---|---|---|---|---|---|---|
| | Formation | | $2^{nd}$ | | 3rd | | 4th | Total |
| | cycle | Accumulation | cycle | Accumulation | Cycle | accumulation | cycle | accumulation | accumulation |
| Comparative Example 1 | 341.2 | 341.2 | 8.1 | 349.3 | 5.3 | 354.6 | 0 | 354.6 | 354.6 |
| Preparation Example 1 | 395.5 | 395.5 | 9.6 | 405.1 | 6.6 | 411.7 | 0 | 411.1 | 411.1 |
| Preparation Example 2 | 401.6 | 401.6 | 9.4 | 411.0 | 5.1 | 416.1 | 0 | 416.1 | 416.1 |
| Preparation Example 3 | 407.8 | 407.8 | 10.0 | 417.8 | 5.9 | 423.7 | 0 | 423.7 | 423.7 |
| Example 1 | 265.2 | 265.2 | 10.2 | 275.4 | 6.4 | 281.8 | 1.0 | 282.8 | 282.8 |
| Example 2 | 310.6 | 310.6 | 9.5 | 320.1 | 7.0 | 327.1 | 0 | 327.1 | 327.1 |
| Example 3 | 258.4 | 258.4 | 8.9 | 267.3 | 5.8 | 273.1 | 0 | 273.1 | 273.1 |
| Example 4 | 249.9 | 249.9 | 7.7 | 257.6 | 5.9 | 263.5 | 0 | 263.5 | 263.5 |
| Example 5 | 270.3 | 270.3 | 9.8 | 280.1 | 6.5 | 286.6 | 0 | 286.6 | 286.6 |
| Example 6 | 275.9 | 275.9 | 8.7 | 284.6 | 6.1 | 290.7 | 1.0 | 291.7 | 291.7 |

Experimental Example 6: Evaluation of the Properties of Improvement in the Initial Charge/Discharge of a Battery, According to the Formation of a Coating Layer For each battery of Examples 1 to 6, Preparation Examples 1 to 3, and Comparative Example 1, the initial charge/discharge properties were measured under the following conditions. The measurement results are recorded in FIG. 3 and the following Table 5.

Figure 3:
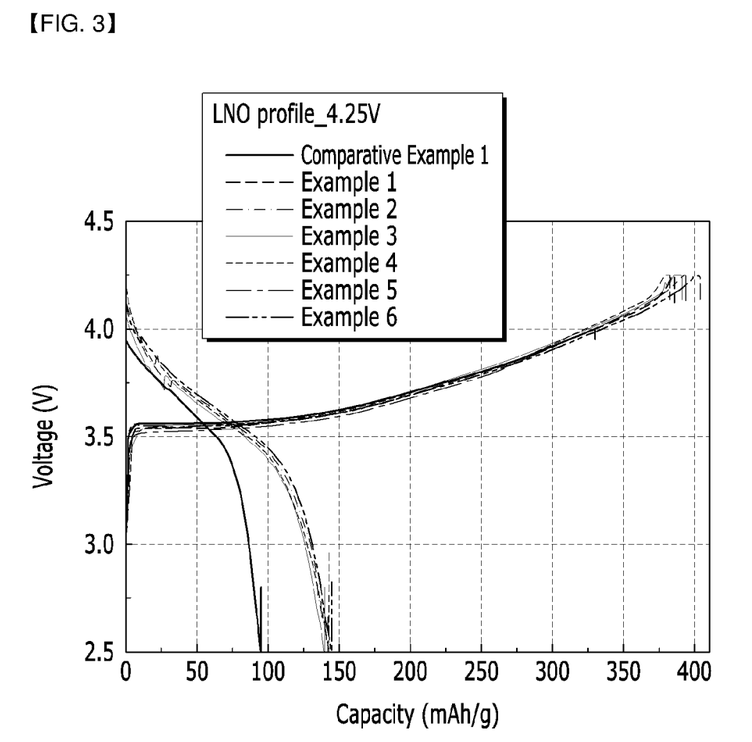
FIG. 3 is a graph measuring and recording the initial ($1^{st}$) charge/discharge property, for each battery of Examples 1 to 8 and each battery of Preparation Examples 1 to 3 and Comparative Example 1.

Charge: 0.1 C, CC/CV, 4.25 V, 0.05 C cut-off
Discharge: 0.1 C, CC, 2.5 V, cut-off According to the following Table 5, it can be confirmed that in Preparation Examples 1 to 3, the initial irreversible capacity of an anode decreased, and the initial efficiency of a cathode increased, compared to Comparative Example 1. Moreover, it can be confirmed that in Examples 1 to 6, the initial efficiency of a cathode further increased, compared to Preparation Examples 1 to 3. However, if the coating amount is excessively increased, the initial charge capacity may be decreased, and thus, it may be required to control within 500 to 9000 ppm.

TABLE 5

| | $1^{st}$ Cycle | 0.1 C Charge (mAh/g) | Anode 0.1 C Discharge (mAh/g) | Cathode Efficiency (%) |
|---|---|---|---|---|
| Capacity (mAh/g) | Comparative Example 1 | 329.8 | 95.2 | 28.9 |
| | Preparation Example 1 | 382 | 142.3 | 37.3 |
| | Preparation Example 2 | 394.2 | 142.8 | 36.2 |
| | Preparation Example 3 | 402.2 | 143.6 | 35.7 |
| | Example 1 | 385 | 143.6 | 37.3 |
| | Example 2 | 383 | 142.5 | 37.2 |
| | Example 3 | 387 | 141.8 | 36.6 |
| | Example 4 | 381 | 143.4 | 37.6 |
| | Example 5 | 396.0 | 144.4 | 36.5 |
| | Example 6 | 404.1 | 145.9 | 36.1 |

Comprehensively reviewing Tables 3 and 4 and FIGS. 2 and 3 with Table 5, it can be seen that although the cores of Preparation Examples 1 to 3 irreversibly discharge lithium ions and oxygen at the initial cycle voltage, for example, 2.5 to 4.25 V (vs. Li/Li+), thereby decreasing the initial irreversible capacity of an anode and increasing the initial efficiency of a cathode compared to Comparative Example 1, there is a limit in increasing the initial efficiency of a cathode due to the presence of lithium by-products.

On the other hand, it can be seen that in Examples 1 to 6, by forming a coating layer on the cores of Preparation Examples 1 to 3, the initial efficiency of a cathode can be further improved. This is considered to be because, as each cathode additive of Examples 1 to 6 has the effects of removing lithium by-products and inhibiting gas generation by the coating layer, while maintaining the effects of the core (namely, decreasing the initial irreversible capacity of an anode and increasing the initial efficiency of a cathode), the initial properties of a battery are further improved.

Meanwhile, in Examples 1 to 6, in order to confirm the effect of improvement in the initial performance of a battery, a cathode mixture was prepared using each cathode additive in the same amount as a common cathode active material, and a cathode and a lithium secondary battery were manufactured. However, if the initial performance of a battery is to be improved while simultaneously securing the long-time life cycle characteristic, the cathode active material may be mixed with the cathode additive of one embodiment at an appropriate mixing ratio according to the aimed battery properties.

III. Examples of Practical Application Forms of a Cathode Additive Including a Core Including a Lithium Nickel Oxide, Nickel Oxide (NiO), and Lithium Oxide ($Li_2O$) and a Phosphorus Compound Coating Layer Examples 7 and 8: Application of the Cathode Additive of Example 1 in Combination with the Cathode Active Material For the practical application form of the cathode additive of Example 1, the cathode additive of Example 1 was used in combination with the cathode active material to prepare a cathode, and a lithium secondary battery including the prepared cathode was manufactured.

Specifically, the cathode additive of Example 1 (core: Preparation Example, 1 coating amount: 2000 ppm), cathode active material of NCM ($LiNi_{0.8}Co_{0.1}Mn_{0.1}O_2$), conductive material (Super-P, Denka Black) and a binder (PVdF) were mixed in an organic solvent (NMP) to prepare a cathode mixture in the form of a slurry, and then the cathode mixture was coated on an aluminum current collector and dried in a vacuum oven at 120° C. for 30 minutes, to manufacture each cathode of Example 7 and 8.

In Examples 7 and 8, the weight ratios of the cathode additive of Example 1: cathode active material:conductive material:binder were 4.825:91.675:1.5:2 (Example 7) and 9.65:86.85:1.5: 2.0 (Example 8), respectively.

Each 2032 coin half-cell was manufactured by the same method as Example 1, using each cathode of Examples 7 and 8 instead of the cathode of Example 1

Comparative Example 2: Application of Cathode Active Material Alone

A cathode was prepared by the same method as Example 1, except that no cathode additive was used, and instead of the cathode additive of Example 1, the same amount of the cathode active material ($LiNi_{0.8}Co_{0.1}Mn_{0.1}O_2$) was used, and a lithium secondary battery including the prepared cathode was manufactured.

Comparative Examples 3 and 4: Application of the Cathode Additive of Preparation Example 1 in Combination with the Cathode Active Material For the practical application of the cathode additive of Preparation Example 1, the cathode additive of Preparation Example 1 was used in combination with the cathode active material to prepare a cathode, and a lithium secondary battery including the prepared cathode was manufactured.

Specifically, the cathode additive of Preparation Example 1 (core: Preparation Example 1, bare), the cathode active material of NCM ($LiNi_{0.8}Co_{0.1}Mn_{0.1}O_2$), the conductive material (Super-P, Denka Black) and the binder (PVdF) were mixed in an organic solvent (NMP) to prepare a cathode mixture in the form of a slurry, and then the cathode mixture was coated on an aluminum current collector and dried in a vacuum oven at 120° C. for 30 minutes, to prepare each cathode of Comparative Examples 3 and 4.

In Comparative Examples 3 and 4, the weight ratios of the cathode additive of Preparation Example 1: cathode active material:conductive material:binder were 4.825:91.67:1.5:2 (Preparation Example 3) and 9.65:86.85:1.5:2.0 (Preparation Example 4), respectively.

Each 2032 coin half-cell was manufactured by the same method as Example 1, using each cathode of Comparative Examples 3 and 4 instead of the cathode of Example 1

Experimental Example 7: Evaluation of the Practical Application Form of the Cathode Additive (Evaluation of the Initial Capacity and Cycle Life Characteristic of A Battery)

Specifically, charge/discharge of each battery of Comparative Examples 2 to 4 and Examples 7 and 8 was progressed at a room temperature of 25° C., under the following conditions. The results are shown in FIG. 4 and the following Table 6.

Figure 4:
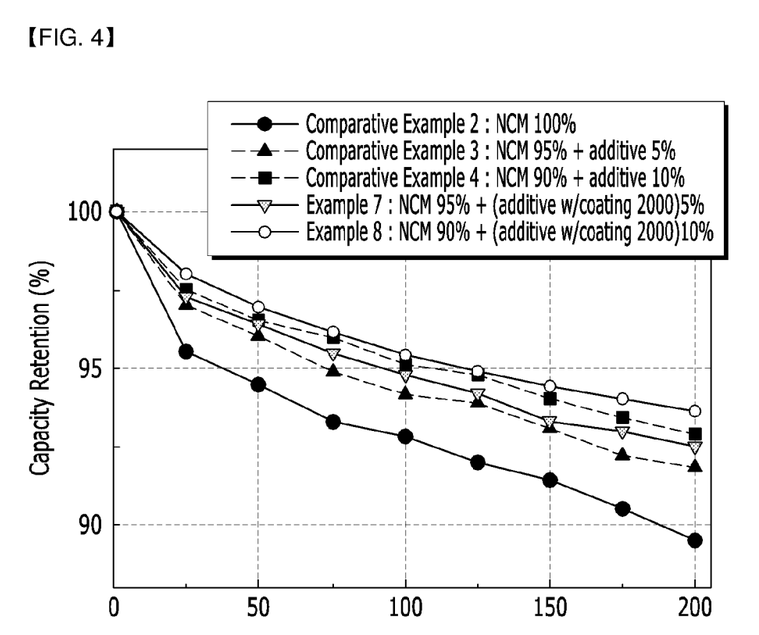
FIG. 4 is a graph measuring and recording the initial ($1^{st}$) charge/discharge property and long-time charge/discharge (($\sim 200^{th}$) property, for each battery of Comparative Examples 2 to 4, and Examples 7 and 8.

Charge: 0.2 C, CC/CV, 4.25 V, 0.005 C cut-off
Discharge: 0.2 C, CC, 2.5 V, cut-off According to FIG. 4 and Table 6, it is confirmed that compared to the case of using the cathode active material only (Comparative Example 2), in case the cathode additive of Preparation Example 1 or the cathode additive of Example 1 was used in combination with the cathode active material (Comparative Examples 3 and 4 Examples 7 and 8), both the initial charge capacity and the cycle life characteristic of a battery are improved.

Further, in case the weight ratio of the additive:active material is identical, when the cathode additive of Example 1 is applied rather than the cathode additive of Preparation Example 1, the initial charge capacity and the life cycle characteristic of a battery are further improved.

TABLE 6

| | Composition of additives | | | Initial operation | | Long-term operation property of a battery | |
|---|---|---|---|---|---|---|---|
| | Core ($\{_x(Li_2NiO_2)\}\bullet\{_y(NiO)\}\bullet\{_z(Li_2O)\}$) | Coating amount (ppm) | Additive: active material (weight ratio) | 0.2 C Charge (mAh/g) | 0.2 C Discharge (mAh/g) | Capacity Retention (%, @ $100^{th}$ cycle) | Capacity Retention (%, @ $200^{th}$ cycle) |
| Comparative Example 2 | — | — | Active material 100% (Ref.) | 226.1 | 206.2 | 92.8 | 89.5 |
| Comparative Example 3 | x = 0.86, y = 0.07, z = 0.07 | — | 5:95 | 235.7 | 204.5 | 94.2 | 91.8 |
| Example 7 | x = 0.86, y = 0.07, z = 0.07 | 2000 | 5:95 | 235.9 | 203.5 | 94.8 | 92.5 |
| Comparative Example 4 | x = 0.86, y = 0.07, z = 0.07 | — | 10:90 | 243.0 | 199.3 | 95.1 | 92.9 |
| Example 8 | x = 0.86, y = 0.07, z = 0.07 | 2000 | 10:90 | 243.1 | 199.1 | 95.4 | 93.6 |

Putting the above results and Experimental Examples 1 to 6 together, it can be confirmed that the core commonly applied in Comparative Examples 3 and 4 and Examples 7 and 8 (a core including the lithium nickel oxide, nickel oxide (NiO), and lithium oxide ($Li_2O$)) irreversibly discharges lithium ions and oxygen preferentially over the cathode active material at the initial voltage charge of a battery, thereby compensating the initial irreversible capacity of an anode and increasing the initial charge capacity of a cathode.

However, in case the core is not coated, there is a limit in increasing the initial efficiency of a cathode due to the existence of lithium by-products, while in case the core is coated with a phosphorus compound, the effects of removing lithium by-products and inhibiting gas generation can be obtained by the coating layer while maintaining the effect of the core (namely, decreasing the initial irreversible capacity of an anode and increasing the initial efficiency of a cathode), and thus the initial properties of a battery are further improved.

Moreover, according to FIG. 4 and Table 6, it can be confirmed that when the cycle number of batteries are identical, the capacity retention rates of Examples 7 and 8 are remarkably high, compared to the capacity retention rates of Comparative Examples 2 to 4.

Such a difference in the capacity retention rates becomes severe as the cycle number of a battery increases, and particularly, it is confirmed that in Comparative Example 2, after the operation of 100 cycles, 92.8% of the initial capacity is maintained, and after the operation of 200 cycles, 89.5% is maintained. On the other hand, it is confirmed that in the case of Examples 7 and 8, after the operation of 100 cycles, 94.8% or more of the initial capacity is maintained, and even after the operation of 200 cycles, 92.5% or more of the initial capacity is maintained. This means that in case battery cycles are progressed while the initial capacity of a cathode increases by the cathode additive of one embodiment, the capacity loss decreases. It also means that after the cathode additive of one embodiment irreversibly discharges lithium ions and oxygen at the initial charge voltage of a battery, it is converted into a composition capable of reversible intercalation and deintercalation of lithium ions, thus partly contributing to the capacity even during the progression of battery cycles.

Moreover, it can be confirmed that under conditions where the core composition of the additive, and the mixing ratio of the additive and the active material are identical, the initial property and the long-term operation property of a battery vary according to whether or not a surface coating exists. Specifically, it is confirmed that the initial property and the long-term operation property of the battery of Example 7 are improved compared to Comparative Example 3, and the initial property and the long-term operation property of the battery of Example 8 are improved compared to Comparative Example 4.

It is considered that under conditions where the core composition of the additive, and the mixing ratio of the additive and the active material are identical, in case the surface of the additive is coated, lithium by-products ($Li_2CO_3$, LiOH, etc.) remaining on the surface of the core are removed, thus inhibiting gas generation in a battery.

Meanwhile, among Examples 7 and 8, in Example 8 wherein a cathode mixture including a higher content of the cathode additive of one embodiment is used, the initial charge capacity and the cycle life characteristic of a battery are further improved. This means that as a cathode mixture including a high content of the cathode additive of one embodiment is used, the initial charge capacity of a battery is further improved, and thus the cycle life characteristic can be more effectively improved. Thus, as explained above, in case the initial performance of a battery is to be improved while simultaneously securing the long-term cycle life characteristic, the cathode additive of one embodiment may be used in combination with the cathode active material at an appropriate mixing ratio, according to the aimed battery properties.

The invention claimed is:

1. A cathode additive comprising:
a core, the composition of which is represented by the following Chemical Formula 1; and
a coating layer positioned on a surface of the core, and comprising a phosphorus (P) compound:

$$\{_x(Li_{2+a}Ni_bM_{1-b}O_{2+c})\} \cdot \{_y(NiO)\} \cdot \{_z(Li_2O)\} \qquad \text{[Chemical Formula 1]}$$

wherein, in Chemical Formula 1,
M is one or more metal atoms forming a divalent cation or a trivalent cation,
$-0.2 \leq a \leq 0.2$, $0.5 \leq b \leq 1.0$, $-0.2 \leq c \leq 0.2$,
$0.7 \leq x \leq 1.0$, $0 < y \leq 0.15$, $0 < z \leq 0.15$, and $x+y+z=1$.

2. The cathode additive according to claim 1, wherein the phosphorus (P) compound includes one or more selected from the group consisting of lithium phosphate ($Li_3PO_4$) and ammonium phosphate ($NH_4H_2PO_4$).

3. The cathode additive according to claim 1, wherein the coating layer is included in a content of 500 to 9000 ppm, based on a total amount of the cathode additive.

4. The cathode additive according to claim 1, wherein the core includes a lithium nickel oxide represented by the following Chemical Formula 1-1, nickel oxide (NiO), and lithium oxide ($Li_2O$), and has a whole composition represented by the above Chemical Formula 1:

$$Li_{2+a}Ni_bM_{1-b}O_{2+c} \qquad \text{[Chemical Formula 1-1]}$$

wherein, in Chemical Formula 1-1,
M, a, b, and c are as defined in Chemical Formula 1.

5. The cathode additive according to claim 1, wherein y=z.

6. The cathode additive according to claim 5, wherein for the core, a peak by lithium oxide ($Li_2O$) is detected in at least one of a range which 2θ is 30 to 35°, a range in which 2θ is 35 to 40°, or a range in which 2θ is 55 to 60°, by XRD (X-Ray Diffraction) measurement by Fe Kα X-ray (X-rα).

7. The cathode additive according to claim 5, wherein a content of lithium oxide ($Li_2O$) in a total amount of the core (100 wt %) is greater than 0 wt % and equal to or less than 15 wt %.

8. The cathode additive according to claim 5, wherein for the core, a peak by nickel oxide ($N_iO$) is detected in at least one of a range in which 2θ is 35 to 40°, a range in which 2θ is 40 to 45°, or a range in which 2θ is 50 to 55°, by XRD (X-Ray Diffraction) measurement by Fe Kα X-ray (X-rα).

9. The cathode additive according to claim 5, wherein the content of nickel oxide ($N_iO$) in the total amount of the core (100 wt %) is greater than 0 wt % and equal to or less than 15 wt %.

10. A method for preparing the cathode additive of claim 1, comprising steps of:
preparing a nickel-based oxide represented by the following Chemical Formula 3;
heat treating a mixture of the nickel-based oxide and lithium oxide ($Li_2O$) to obtain a core; and
heat treating a mixture of the core and ammonium phosphate ($NH_4H_2PO_4$) to form a coating layer on the surface of the core:

$$(Ni_dM_{1-d})O_2 \qquad \text{[Chemical Formula 3]}$$

wherein, in Chemical Formula 3,
M is a metal atom forming a divalent cation or a trivalent cation, and
$0.5 \leq d \leq 1.0$.

11. The method for preparing a cathode additive according to claim 10, wherein the step of forming a coating layer on the surface of the core is conducted under an inert atmosphere.

12. The method for preparing a cathode additive according to claim 10, wherein the step of forming a coating layer on the surface of the core is conducted at 600 to 800° C.

13. The method for preparing a cathode additive according to claim 10, wherein the step of obtaining the core is conducted under an inert atmosphere.

14. The method for preparing a cathode additive according to claim 10, wherein the step of obtaining the core is conducted at 600 to 800° C.

15. A cathode mixture comprising:
the cathode additive of claim 1; and
a cathode active material.

16. The cathode mixture according to claim 15, wherein the cathode additive is included in the content of 1 to 30 wt %, based on the total weight of the mixture (100 wt %).

17. The cathode mixture according to claim 15, wherein the cathode active material includes lithium and one or more composite oxides selected from the group consisting of a metal of cobalt, manganese, nickel, and a combination thereof.

18. The cathode mixture according to claim 15, further comprising a conductive material, a binder, or a mixture thereof.

19. A lithium secondary battery comprising:
a cathode comprising the cathode mixture of claim 15;
an electrolyte; and
an anode.

20. The lithium secondary battery according to claim 19, wherein the anode includes one or more anode active materials selected from the group consisting of a carbon-based anode active material, as lithium metal, as lithium alloy, Si, $SiO_x$ ($0<x<2$), a Si—C composite, a Si-Q alloy (wherein Q is an alkali metal, an alkali earth metal, an atom of Groups 13 to 16, a transition metal, a rare earth atom, or a combination thereof, provided that it is not Si), Sn, $SnO_2$, a Sn—C composite, and a Sn—R (where R is an alkali metal, an alkali earth metal, an atom of Groups 13 to 16, a transition metal, a rare earth metal, or a combination thereof, provided that it is not Sn).

* * * * *